United States Patent
Kim et al.

(10) Patent No.: US 8,336,036 B2
(45) Date of Patent: Dec. 18, 2012

(54) SYSTEM AND METHOD FOR TRANSLATING HIGH PROGRAMMING LEVEL LANGUAGES CODE INTO HARDWARE DESCRIPTION LANGUAGE CODE

(75) Inventors: Seon Wook Kim, Namyangju (KR); Thi Huong Giang Nguyen, Seoul (KR)

(73) Assignee: Korea University Industrial & Academic Collaboration Foundation, Seoul (KR)

( * ) Notice: Subject to any disclaimer, the term of this patent is extended or adjusted under 35 U.S.C. 154(b) by 853 days.

(21) Appl. No.: 12/392,463

(22) Filed: Feb. 25, 2009

(65) Prior Publication Data
US 2010/0131933 A1    May 27, 2010

(30) Foreign Application Priority Data
Nov. 21, 2008   (KR) .......................... 10-2008-0116417

(51) Int. Cl.
*G06F 9/45*  (2006.01)

(52) U.S. Cl. .......... 717/137; 717/136; 717/148; 717/153
(58) Field of Classification Search ........................ None
See application file for complete search history.

(56) References Cited

U.S. PATENT DOCUMENTS
6,751,583 B1 *  6/2004  Clarke et al. ................... 703/17
* cited by examiner

*Primary Examiner* — Chuck Kendall
(74) *Attorney, Agent, or Firm* — Rabin & Berdo, P.C.

(57) ABSTRACT

The present invention is directed to a method and system for translating a high programming level language code such as C, C++, Fortran, Java or the like into a HDL code such as Verilog or VHDL. The system includes: a C-to-C source translator which reads user API from a translation-targeted high level language code marked with the user API, separates the translation-targeted high level language code into a hardware code part and a software code part, and stores the hardware code part and the software code part in separate files; a main compiler which compiles the stored software code part; a translator which translates the stored hardware code part into a HDL code including one or more block modules and one top module; a main core which executes the compiled software code part; and a dedicated hardware which executes the HDL code.

17 Claims, 7 Drawing Sheets

```
//enable_bb[i]=1:module i is enabled
//finish_bb[i]=1:module i finished its execution
//successor[i]:the taken or not taken value of module i branch
always@(posedge clk or negedge reset)
begin
    ...
    case(pc)
        0 begin
                    enable_bb<=4'b0001; // enable module 0
                    pc <= 1;
        end
        1 pc <= 2;
        2   //decide the next module after module 0 branch
          if(successor[0])
          begin
                    enable_bb <= 4'b1000;
                    pc <= 6;
          end
          else begin
                    enable_bb <= 4'b0001;
                    pc <= 3;
          end
        3 pc <= 4; // wait for block module 1
        4 begin
                    enable_bb <= 4'b0100;
                    pc <= 5;
        end
        5 if(finish_bb[2])
            begin
                if(successor[2])
                begin
                    enable_bb<=4'b0100; // backward jump
                    pc <= 5;
                end
                else begin
                    enable_bb <= 4'b1000;
                    pc <= 6;
                end
            end
            else pc <=5;
        6 if(finish_bb[3])
            begin
                    pc <= 7;
                    finish <=1;              //the function finished
                    enable_bb <= 4'b0000;   //stop all block modules
            end
            else begin
                    pc <= 6;
                    enable_bb <= 4'b1000;
            end
        7 begin
                    pc <= 7;
                    finish <=0;
            end
    endcase
end
```

SYSTEM AND METHOD FOR TRANSLATING HIGH PROGRAMMING LEVEL LANGUAGES CODE INTO HARDWARE DESCRIPTION LANGUAGE CODE

CROSS-REFERENCE TO RELATED APPLICATION

This application claims the benefit of Korean Application No. 10-2008-0116417, filed on Nov. 21, 2008, with the Korean Intellectual Property Office, the disclosure of which is incorporated herein by reference.

BACKGROUND OF THE INVENTION

1. Field of the Invention

The present invention relates to a system and method for translating a high programming level languages code into a HDL code such as Verilog or VHDL, and more particularly, to a system and method for translating high programming level language codes into a HDL code, which is capable of accelerating applications by using a compiler backend to translate a high programming level language code, such as C, C++, Fortran or even Java, into a HDL (Hardware Description Language) code and logically synthesizing the HDL code in such a manner that it is cooperated with a main core.

2. Description of the Related Art

Digital circuit designs have been rapidly evolved over the past few decades. At an initial stage, digital circuits were designed using vacuum tubes and transistors, followed by integrated circuits (ICs) having logic gates integrated on one chip. Development of technologies has led to from SSI (Small Scale Integration) having a few number of logic gates, through MSI (Medium Scale Integration), to LSI (Large Scale Integration) having thousands of logic gates integrated on one chip. At this point of time, CAD (Computer Aided Design) technology has been required and developed. Chip designers have started to use logic simulation technologies in order to verify functions of blocks each having about 100 transistors, however, circuits have been still tested on breadboards and layouts have been drawn on paper or manually even with computers.

However, with further development to VLSI (Very Large Scale Integration) having about 100,000 transistors integrated on one chip, circuits become have been so complicated as not to be tested on breadboards any longer. Accordingly, computer-aided technologies have been essential to verification of VLSIs and P&R (Place and Routing) has also been automated by use of computers. Chip designers have designed a chip in the unit of small block at a logic gate level and designed up to a top-level block using small blocks and have introduced a logic simulator for function verification before the chip is actually fabricated.

Programming languages such as Fortran, Pascal, C and the like have been used to describe sequentially-operating computer programs for a long time. Similarly, digital circuit designers have felt the necessity of a standardized language to describe digital circuits, which results in HDL (Hardware Description Language). HDL can describe a concurrent procedure corresponding to hardware characteristics and may be represented by Verilog HDL and VHDL. Verilog HDL started from Gateway Design Automation and VHDL has been developed with support by DARPA (Defense Advanced Research Projects Agency).

Although HDL has often been used for logic verification, automated translation of circuit designs created by HDL into circuit diagrams expressed by logic gates has not been achieved. However, circuit design methods have made rapid progress with the advent of logic synthesis, thereby making it possible to design digital circuits at RTL (Register Transfer Level). That is, when a designer defined a data flow and process between registers, a logic synthesis tool could make connections between logic gates automatically.

Accordingly, HDL has played a leading role in digital circuit designs and circuit designers had no need to array and connect logic gates and draw circuit diagrams. Moreover, the use of HDL made it possible to make complicated designs by describing functions and data flows at abstraction levels.

However, as the complexity of electronic systems increases nowadays, there is an increasing need to describe the whole system at higher abstraction levels. Languages of such abstraction levels may include, for example, SystemC, SA-C, which are modeling languages of a system level, Fortran, C and C++, which are high programming level languages. When the whole system is described using such high level languages, hardware developers have a need to translate such high level languages into HDL codes such as Verilog HDL or VHDL. In addition, as software developers and hardware developers may make development with different languages, there is a problem that they have to perform system verification with tools of different levels.

For the purpose of overcoming such a problem, there are many previous researches about tools or methods of translating software level languages into HDL codes. However, there is a great difference between the programming concepts of hardware and software in translating high level language codes into HDL codes and so it is very difficult to express all software language syntaxes, such as pointer, two dimensional arrays and so on, in HDL languages. Accordingly, the conventional tools or methods have many limitations in that they can support only the translation from system level language codes, such as SystemC, SA-C, Streams-C and the like, into HDL codes, or even when some systems allow direct translation from high level languages into HDL, only a portion of high level language syntaxes can be directly translated.

SUMMARY OF THE INVENTION

To overcome the above problems, it is therefore an object of the present invention to provide a method which can be used for all high level language syntaxes and semantics and is capable of translating all high level language codes supported by a main compiler into HDL codes.

It is another object of the present invention to provide a method of translating high level language codes into HDL codes, which is capable of using all optimizations used for high level language codes by using a main compiler, such as GCC, as a base compiler.

To achieve the above objects, according to an aspect of the invention, there is provided a method of translating a high level language code into a HDL code, including the steps of: (1) marking API on a translation-targeted high level language code; (2) separating the translation-targeted high level language code marked with API into a software code part and a hardware code part and storing the software code part and the hardware code part in separate files; (3) compiling the stored software code part by means of a main compiler such as GCC and translating the stored hardware code part into a HDL code by means of a translator; and (4) executing the compiled software code part in a main core and executing the HDL code in a dedicated hardware such as FPGA.

According to another aspect of the invention, there is provided a system for translating a high level language code into a HDL code, including: a C-to-C source translator which reads user API such as OpenMp from a translation-targeted high level language code marked with the user API, separates the translation-targeted high level language code into a hardware code part and a software code part, and stores the hardware code part and the software code part in separate files; a main compiler which compiles the stored software code part; a translator which translates the stored hardware code part into a HDL code including one or more block modules and one top module; a main core which executes the compiled software code part; and a dedicated hardware which executes the HDL code in cooperation with the main core.

According to still another aspect of the invention, there is provided a system for translating a high level language code into a HDL code using a compiler backend, the compiler backend including: a main compiler; a machine description file whose syntax is equal to a HDL syntax attached to a backend of the main compiler; and a HDL control generator which is attached to the backend of the main compiler immediately before a stage of generation of a target assembly code.

According to yet still another aspect of the invention, there is provided a method of translating a low level IR code of a main compiler into a HDL code using a main compiler backend, including the steps of: translating a high level language code into a low level IR code by means of a front end and a middle end of a main compiler; and translating the low level IR code into a HDL code by means of a translator attached to an backend of the main compiler.

According to the present invention, a high level language code to HDL code translation system and method can be used for all high level language syntaxes and semantics and is capable of translating all high level language codes supported by a main compiler into HDL codes. In addition, the system and method is capable of using all optimizations used for high level language codes by using a main compiler as a base compiler.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Hereinafter, preferred embodiments of the present invention will be described in detail with reference to the accompanying drawings.

Figure 1:
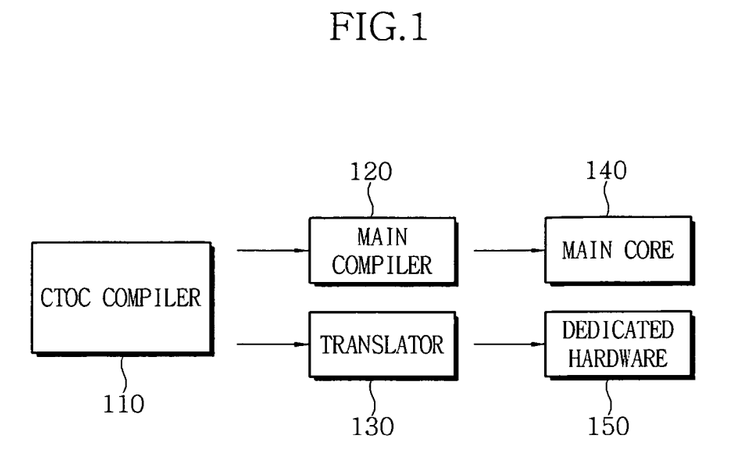
FIG. 1 is a structural view of a system for translating a high level language code into a HDL code according to an embodiment of the present invention.

FIG. 1 is a structural view of a system for translating a high level language code into a HDL code according to an embodiment of the present invention.

Referring to FIG. 1, a high level language code to HDL code translation system of the present invention includes a C-to-C source translator 110, a main compiler 120 such as GCC (GNU Compiler Collection), a translator 130 which translates low level IR (Intermediate Representation) into HDL such as Verilog, a main core 140 such as ARM (Advanced RISC Machine), and a dedicated hardware 150 such as FPGA (Field Programmable Gate Array).

If API such as a translation-targeted high level language pragma is marked on a high level language code to be translated, the C-to-C source translator 110 reads the API and separates the translation-targeted high level language code into a hardware code part and a software code part which are then stored in separate files. Here, the hardware code part refers to a subroutine code part which is a separate instruction group repeatedly used in particular or plural programs of the translation-targeted high level language code, and the software code part contains the remaining parts of the translation-targeted high level language code, and a function call to the hardware code part.

The main compiler 120 serves to compile the software code part, which was separated and stored by the C-to-C source translator 110, to be translated into an executable code.

The translator 130 serves to translate the hardware code part, which was separated and stored by the C-to-C source translator 110, into a HDL code.

The main core 140 and the dedicated hardware 150 serve to execute the executable code compiled by the main compiler 120 and the HDL code translated by the translator 130, respectively, in mutual cooperation.

Figure 2:
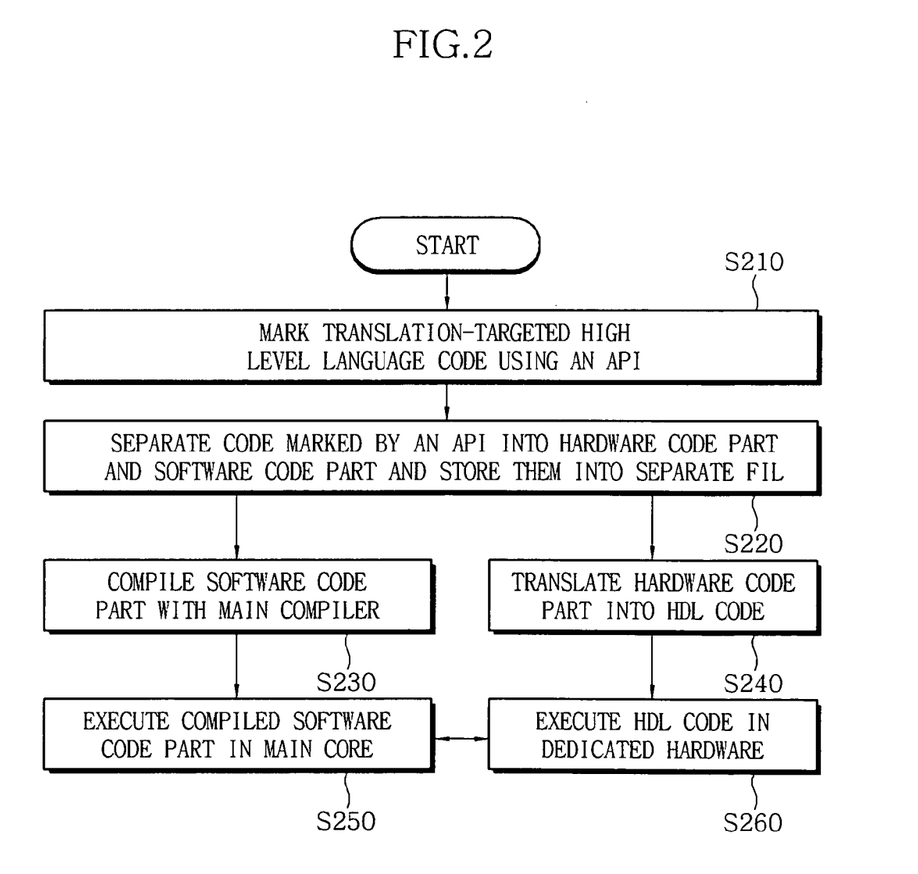
FIG. 2 is a flow chart showing a process of translating a high level language code into a HDL code according to an embodiment of the present invention.

FIG. 2 is a flow chart showing a process of translating a high level language code into a HDL code according to an embodiment of the present invention.

Referring to FIG. 2, a high level language code to HDL code translation method of the present invention includes a step of marking a translation-targeted high level language code with API (S210), a step of separating the marked code into a hardware code part and a software code part and storing these code parts in separate files (S220), a step of compiling the software code part using the main compiler (S230), a step of translating the hardware code part into a HDL code (S240), a step of executing the compiled software code part in the main core (S250), and a step of executing the translated HDL code in the dedicated hardware (S260). Here, the main core and the dedicated hardware work in mutual cooperation.

Figure 3:
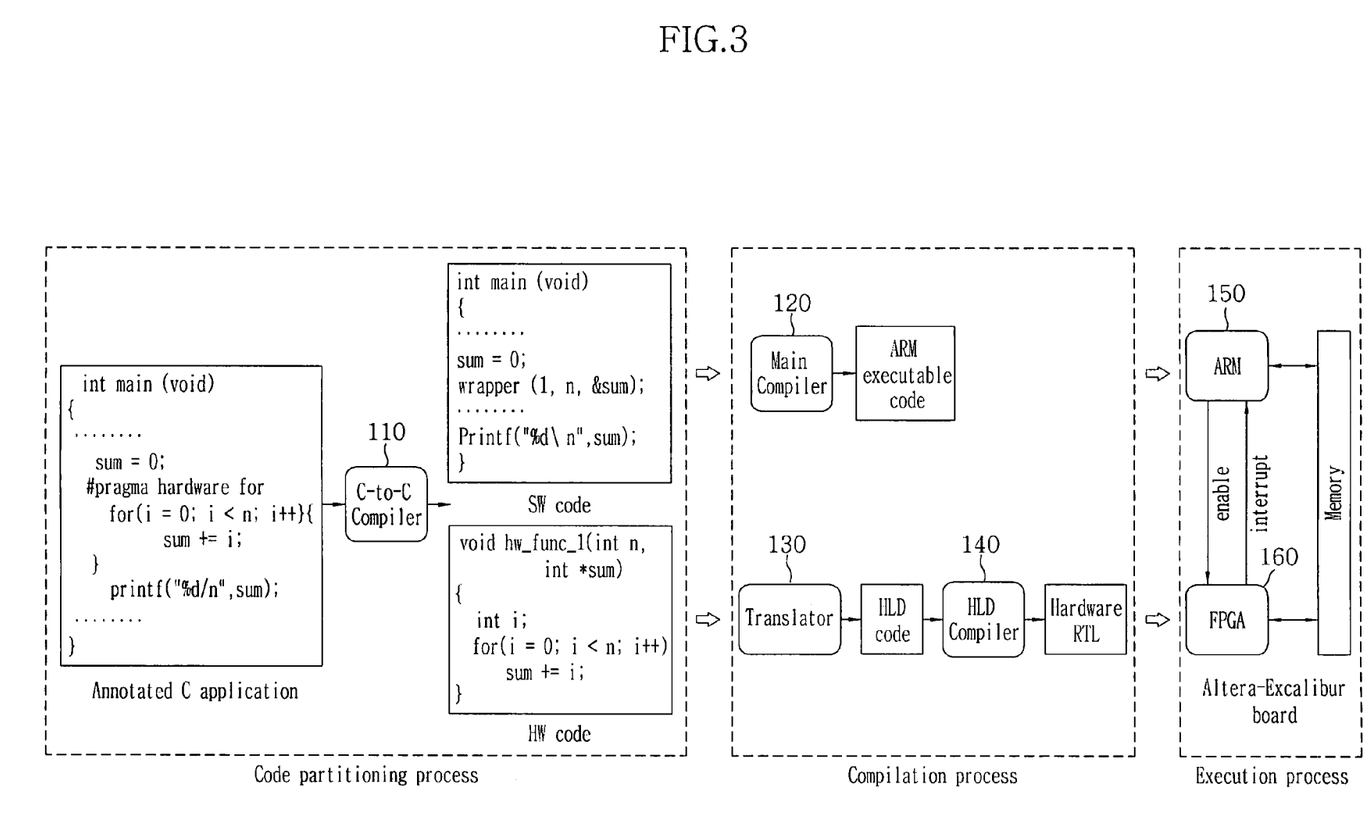
FIG. 3 is a view showing an exemplary system configuration in case where a language to be translated is C language, according to an embodiment of the present invention.

FIG. 3 is a view showing an exemplary system configuration in case where a language to be translated is C language, according to an embodiment of the present invention.

Referring to FIG. 3, as described earlier, when API such as a pragma is marked on a translation-targeted code written using, for example, a high level programming C language, the C-to-C source translator 110 reads the API such as the pragma, separates the translation-targeted code into the hardware code part and the software code part, and then stores the code parts in separate files. Thereafter, the software code part is compiled by the main compiler 120 such as GCC and then is executed in a main core 150 such as ARM, and the hardware code part is translated into the HDL code by the translator 130, which is then compiled by a dedicated hardware compiler 140 such as a FPGA compiler and is executed in a dedicated hardware 160 such as FPGA. Since the software code part contains a function call to the hardware code part, the main core 150 and the dedicated hardware 160 execute the hardware code part and the software code part, respectively, in mutual cooperation.

Figure 4:
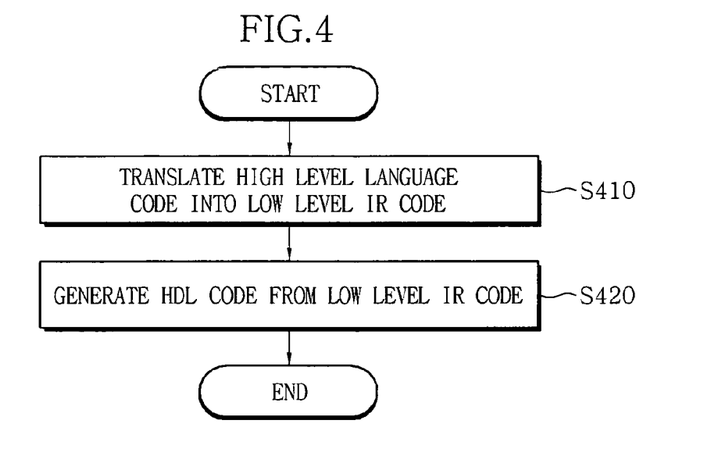
FIG. 4 is a flow chart showing a process of translating a separately stored hardware code part into a HDL code by means of a C-to-C source translator according to an embodiment of the present invention.

FIG. 4 is a flow chart showing a process of translating a separately stored hardware code part into a HDL code by means of a C-to-C source translator according to an embodiment of the present invention.

Referring to FIG. 4, a process of translating a high level language hardware code part into a HDL code such as Verilog may include a step of translating a high level language code into low level IR (Intermediate Representation) such as an RTL code (S410), and a step of generating a HDL code such as Verilog from the low level IR such as RTL immediately before a step of generating a targeted assembly code (S420).

The step of translating the hardware code part into the low level IR code such as RTL (S410) is to translate a high level language code into low level IR such as an RTL code, which is an immediate representation of GCC, by means of the main compiler such as GCC, and the step of generating a HDL code such as Verilog from the low level IR such as the RTL code is to translate the low level IR into a HDL code by means of a translator of the present invention, which is attached to a backend of the main compiler such as GCC. Here, the translator is attached to the backend of the main compiler such as GCC immediately before the step of generating the targeted assembly code, and, by using a front end and a middle end of the main compiler, an architecture of the present invention allows translation of all high level language codes supported by the main compiler into HDL codes.

Hereinafter, the method of generating a HDL code such as Verilog from low level IR such as RTL will be described in more detail.

Assuming a GCC compiler is used as the main compiler, a middle end part of the GCC compiler uses an intermediate representation called RTL to perform an optimization algorithm before converting it to an assembler language. As described earlier, the translator of the present invention is attached to the backend part of the main compiler such as GCC and translates the low level IR such as GCC RTL into the HDL cod such as Verilog instead of an ASM code. In the present invention, since the final low level IR version of the main compiler was used, it is possible to use all optimizations of the main compiler.

GCC is a multi-target compiler and its backend uses preprocessor macros and function defined by the targeted architecture to direct the code generation of the target architecture assembler language called a machine description file. The machine description file in the GCC compiler defines how to translate a. RTL instruction into a corresponding instruction in the target language. The system of the present invention creates and utilizes its own machine description file whose syntax is equal to a Verilog syntax to perform the RTL to Verilog translation.

Figure 5:
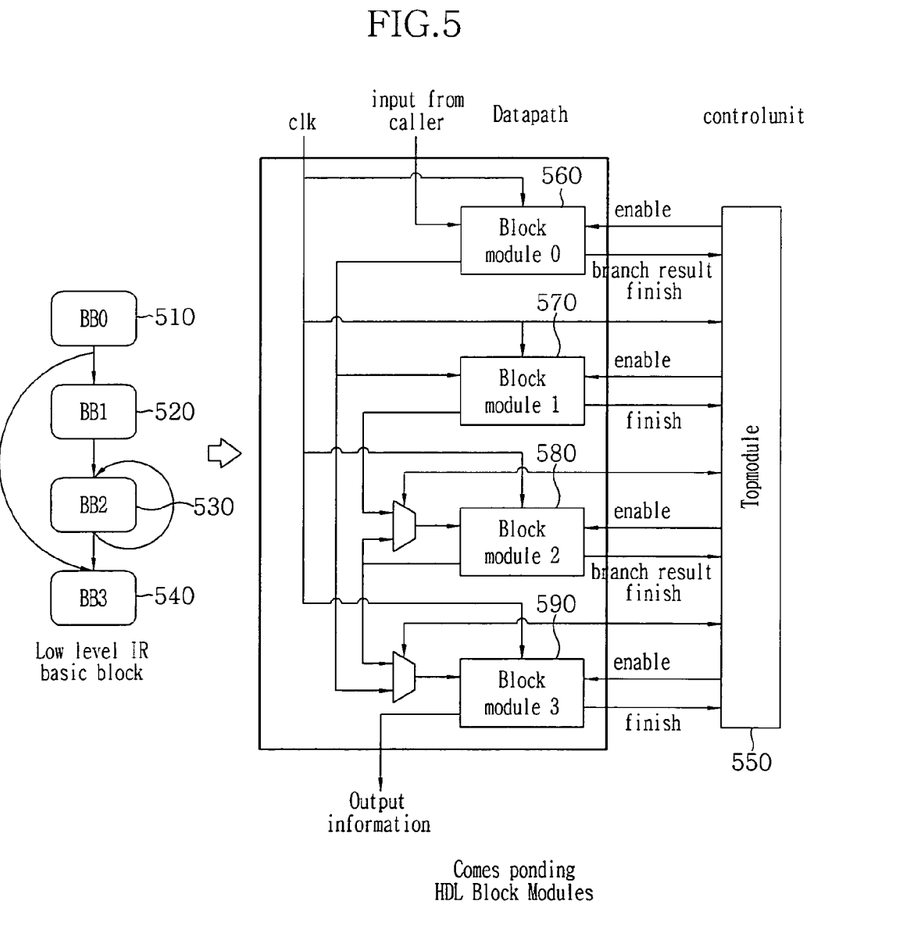
FIG. 5 is a block diagram showing a control flow of a low level IR code of a main compiler, generation of corresponding HDL modules, and communication between the HDL modules according to an embodiment of the present invention.

FIG. 5 is a block diagram showing a control flow of a low level IR code of a main compiler, generation of corresponding HDL modules, and communication between the HDL modules according to an embodiment of the present invention. Referring to FIG. 5, in GCC, RTL codes of a function are divided into several basic blocks 510 to 540, each of which has only one entry point and only one exit point. Accordingly, a control flow of a code is decided at the end of basic blocks. That is, a currently executed basic block or a predecessor identifies the next basic block or a successor which should be executed after it. The input or output information between the predecessor and the successor is a register file. In this case, the successor will use register files updated by the predecessor for its execution.

The system of the present invention creates and utilizes HDL modules called block modules to perform the task of basic blocks of the low level IR code. Each block module has its own resister set or a resister set shared with other block modules. The register file in the low level IR code is implemented as input and output signals of the block modules.

Referring to FIG. 5, the HDL modules of the present invention may include two kinds of modules, i.e., block modules 560 to 590 to perform the same task as the basic blocks of the low level IR code such as RTL and a top block 550 to control and schedule the execution of the block modules 560 to 590. The top module 550 controls execution between plural different block modules. Specifically, the top module 550 assigns inputs to the block modules and enables one or more of the block modules. When enabled, a block module executes its code with assigned inputs, buffers its output in its own register set or a register set shared with other block modules, and returns that output buffered in the register set as well as control flow outcome to the top module 550. Then, the top module 550 decides which block module should be executed next based on the control flow outcome. Using such a mechanism, a data path by the block modules can be separated from a control path by the top module.

Body codes of each of the block modules are generated by the machine description file of the present invention directly from the low level IR code such as RTL. On the other hand, body codes of the top module are generated by a HDL control generator of the present invention based on information of the basic blocks of the low level IR code. The output of the translator of the present invention contains several block modules and one top module.

Figure 6:
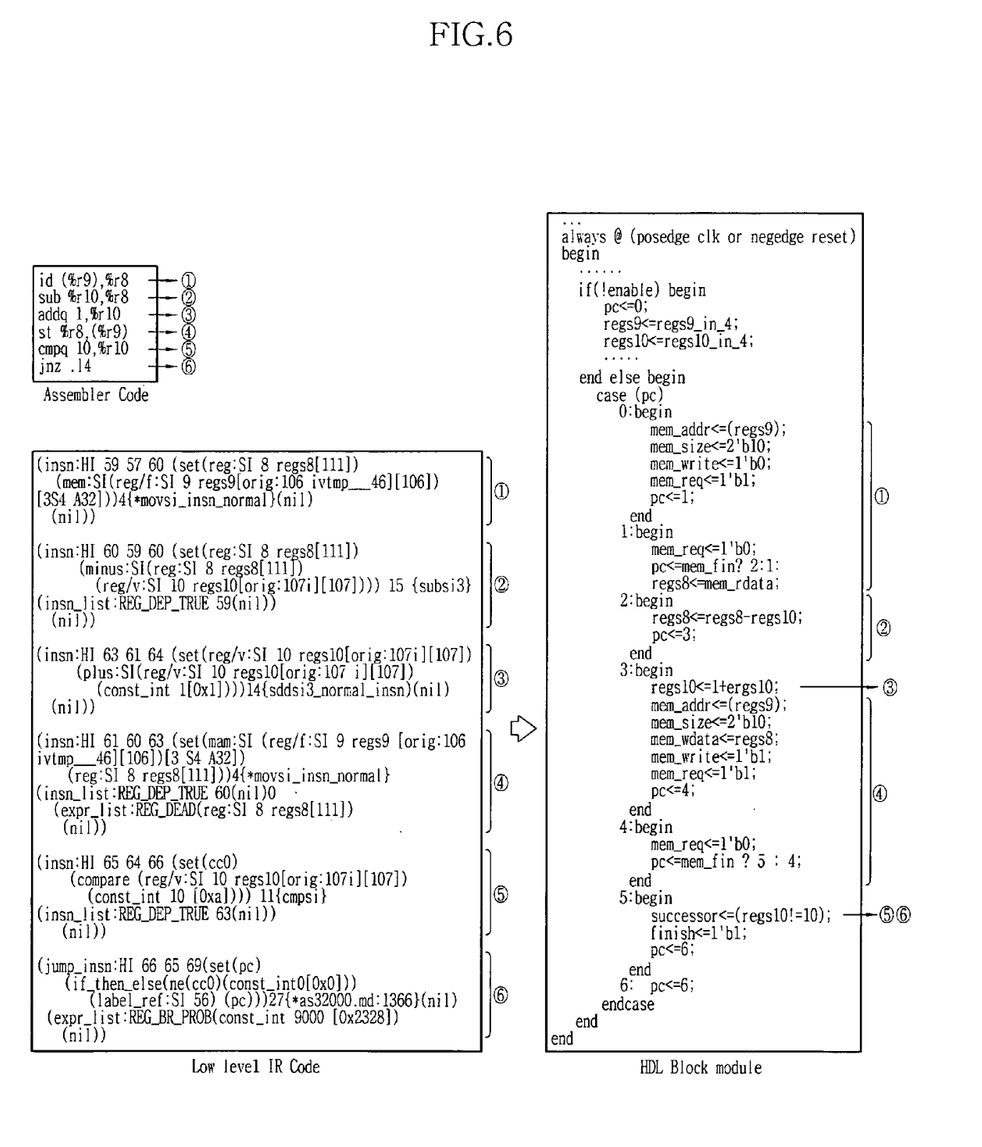
FIG. 6 is a block diagram showing generation of block modules of a corresponding HDL code from basic blocks of a low level IR code according to an embodiment of the present invention.

FIG. 6 is a block diagram showing generation of block modules of a corresponding HDL code from basic blocks of a low level IR code according to an embodiment of the present invention.

Referring to FIG. 6, parts ① to ⑥ of an assembler code are respectively translated into basic blocks ① to ⑥ of a corresponding low level IR code, from which corresponding block modules ① to ⑥ of a HDL code are generated.

Hereinafter, HDL code generation for the block modules of the present invention will be described.

Figure 7:
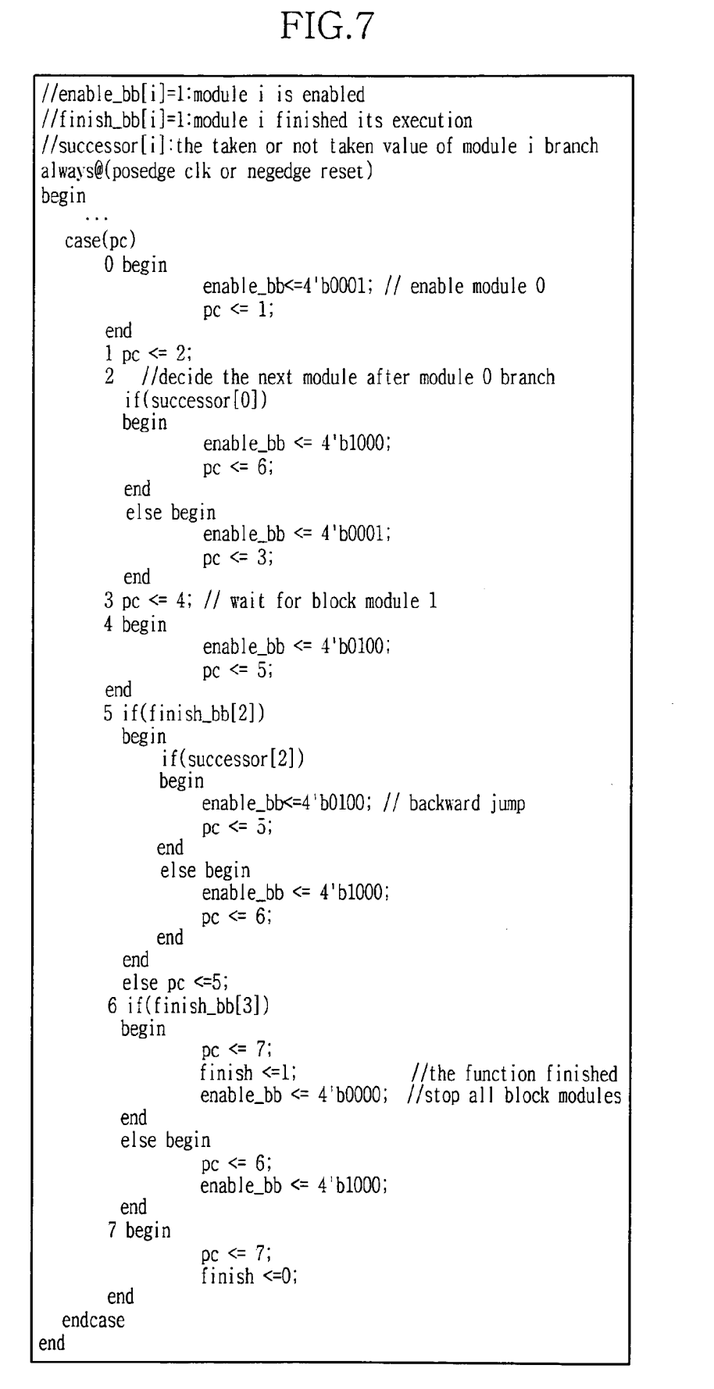
FIG. 7 is a view showing an example of a FSM module of a HDL module according to an embodiment of the present invention.

Every HDL module is generated in the form of a Finite State Machine (FSM) using only combination of block modules. FIG. 7 is a view showing an example of a FSM module of a HDL module according to an embodiment of the present invention. Referring to FIG. 7, there is no control flow within a block module, so a code is just a sequence of consecutive low level IR instructions. Referring to FIG. 7, the instruction sequence is divided into several parts, each of which corresponds to a stage of the FSM. After finishing the execution of all instructions in the current stage, a stage variable is set to the next coming stage number.

Each FSM stage is executed within one clock cycle, so a FSM stage can execute one or several low level IR instructions. The more instruction which can be executed within one FSM stage, the faster the performance of a dedicated hardware such as FPGA. The condition of instructions that can be executed within one stage is that: the instructions are parallel, i.e., independent of each other. The translator of the present invention decides how to break the low level IR instruction sequence into stages based on delay estimation and data dependency of instructions. It is considered that the addition, subtraction, assignment, shift and logic operation are not time consuming operations and can be executed within one cycle. Several non-time consuming operations can be included in one FSM if only they are parallel. However, the multiplication, division and memory access are time consuming operations, so instructions which depend on these operations have to wait for completion of these operations and are then executed in the next cycles.

Next, HDL code generation for the top module will be described.

Two main tasks of the top module are to assign input/output to block modules and to schedule their execution. In order to assign input/output signals, the top module creates instances of block modules. This is because the block modules can not be directly defined and used but can be just defined in a structural/functional fashion and instantiation is required to use the defined block modules.

The top module assigns outputs of a currently executed block module as an input of a block module to be executed next. The predecessor/successor relationship among block modules is the same as in RTL basic blocks.

The top module is provided with a control unit which performs the task of scheduling block modules. This control unit is also implemented in the form of a FSM, and therefore has functions of:

Enabling/disabling block modules by setting their enable signals

Figure 8:
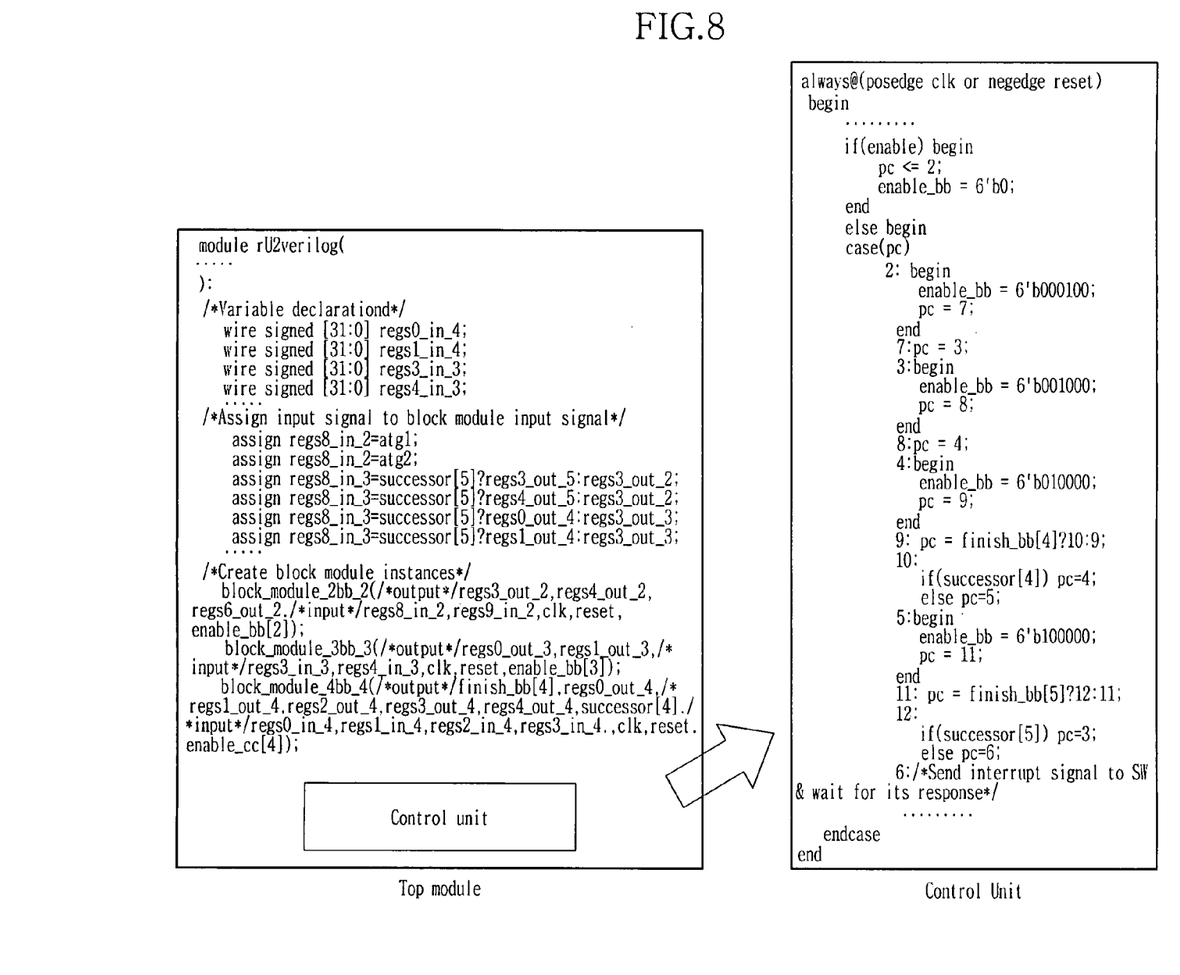
FIG. 8 is a view showing an example of a top module and a control unit of the top module according to an embodiment of the present invention.

Generating an interrupt signal to cause a program (software) to announce the completion of its execution FIG. 8 is a view showing an example of the top module and the control unit of the top module according to an embodiment of the present invention. Referring to FIG. 8, as described above, the top module includes the control unit, declares variables, assigns input signals to block modules, and creates instances of block modules. In addition, the control unit is implemented in the form of a FSM.

Next, information exchange between a main core such as ARM, which is a kind of microprocessor, and a dedicated hardware such as FPGS will be described.

Figure 9:
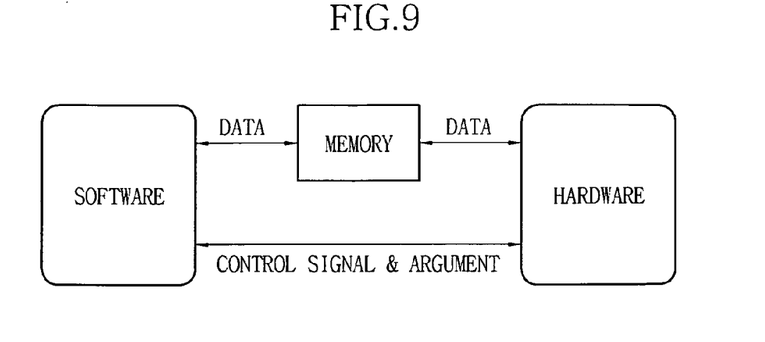
FIG. 9 is a block diagram showing information exchange between software and hardware according to an embodiment of the present invention.

FIG. 9 is a block diagram showing information exchange between software and hardware according to an embodiment of the present invention. Referring to FIG. 9, software and hardware exchange information via a memory and exchanges a control signal and arguments in a direct manner.

Figure 10:
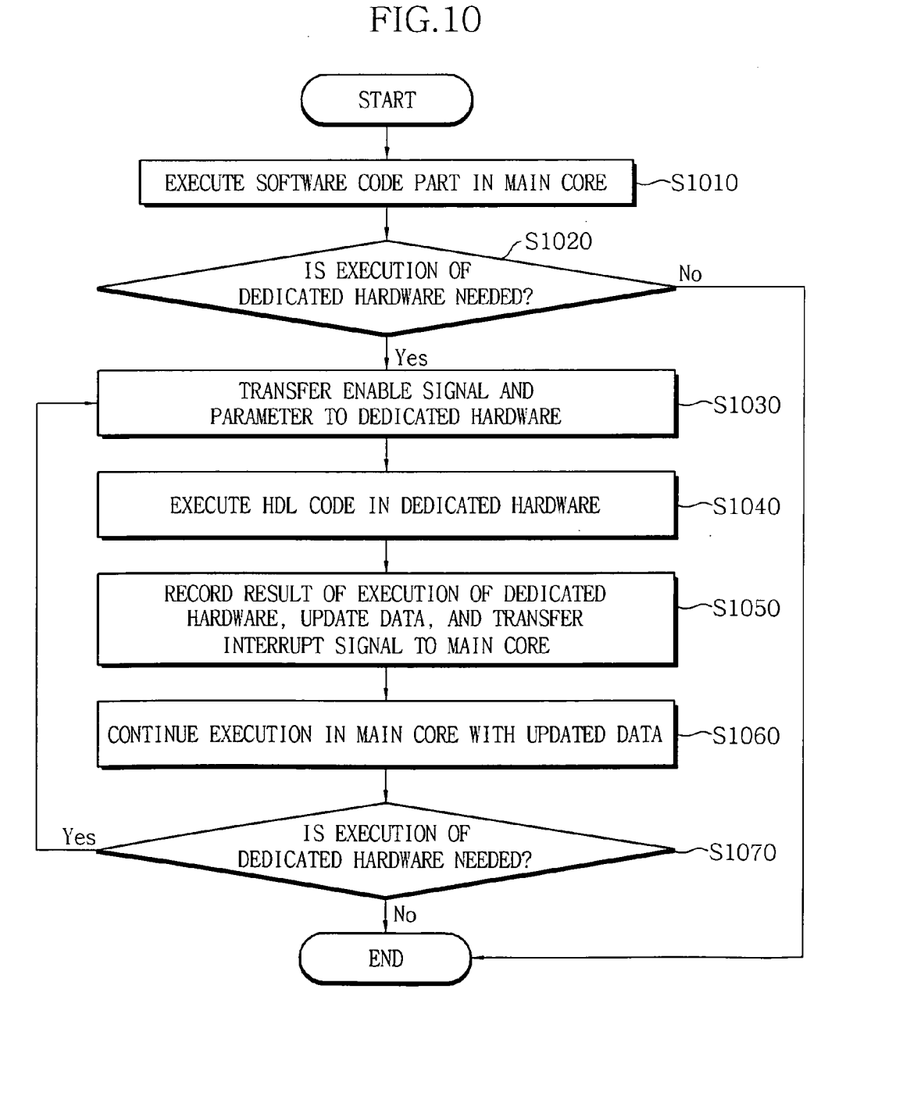
FIG. 10 is a flow chart showing an execution procedure of a software code part in a main core and a hardware code part in a dedicated hardware according to an embodiment of the present invention.

FIG. 10 is a flow chart showing an execution procedure of a software code part in a main core such as ARM and a hardware code part in a dedicated hardware such as FPGA according to an embodiment of the present invention. Referring to FIG. 10, at the starting point, the software code part in the main core is executed (S1010) Next, it is determined whether or not the software code part needs execution of the dedicated hardware (S1020). If the execution of the dedicated hardware is needed, an enable signal and parameters are transferred to the dedicated hardware (S1030). Next, the dedicated hardware enabled by the enable signal executes the hardware code part, which is the HDL code (S1040). Next, by transferring an interrupt signal to the main core after recording a result of the execution of the dedicated hardware and updating data, the dedicated hardware informs the main core of the completion of the execution (S1050). Finally, upon receiving the execution completion from the dedicated hardware, the main core continues to execute the software code part with the updated data (S1060). If there is no need of further execution of the dedicated hardware, the program is terminated.

While the present invention has been particularly shown and described with reference to exemplary embodiments of high level language code to HDL code translation method and system, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A method of translating a high level language code into a HDL code, comprising the steps of:
    (1) marking API on a translation-targeted high level language code;
    (2) separating the translation-targeted high level language code marked with API into a software code part and a hardware code part and storing the software code part and the hardware code part in separate files;
    (3) compiling the stored software code part of the translation-targeted high level language code by means of a main compiler and translating the stored hardware code part of the translation-targeted high level language code into a HDL code by means of a translator,
        wherein the translation of the stored hardware code part into a HDL code by means of a translator includes
        translating the hardware code part into a low level IR code of the main compiler immediately before generation of a target assembly code, and
        translating the low level IR code into the HDL code; and
    (4) executing the compiled software code part in a main core and executing the HDL code in a dedicated hardware.

2. The method according to claim 1, wherein the hardware code part in step (2) has a subroutine form of the translation-targeted high level language code, and the software code part contains the remaining parts of the translation-targeted high level language code, and a function call to the hardware code part.

3. The method according to claim 1, wherein the step of translating the hardware code part into a low level IR code includes translating a high level language code into a low level IR code of the main compiler by means of the main compiler immediately before generation of a target assembly code of the main core, and
    wherein the step of translating the low level IR code into the HDL code includes translating the low level IR code into the HDL code by means of the translator attached to a backend of the main compiler.

4. The method according to claim 1, wherein the HDL code includes one or more block modules having body codes generated directly from the low level IR code by a machine description file whose syntax is equal to a HDL syntax, and one top module generated based on information of basic blocks of the low level IR code.

5. The method according to claim 4, wherein the one or more block modules perform the same task as the basic blocks of the low level IR code, and the top module enables/disables the one or more block modules, schedules execution of the one or more block modules and creates instances of the one or more block modules.

6. The method according to claim 4, wherein the one or more block modules and the top module are generated in the form of a Finite State Machine, and the one or more block modules are a sequence of consecutive RTL instructions separated based on delay estimation and data dependency of the RTL instructions.

7. The method according to claim 4, wherein execution of the block modules and the top module cause the top module to operate one or more of the one or more block modules and waits for completion of the operation of the one or more block modules operated after assigning inputs to the one or more of the block modules and operating the one or more block modules, the operated one or more block modules execute their own codes with the assigned inputs, buffer outputs in their own register sets or register sets shared with another of the block modules, and return the output buffered in the register sets as well as control flow outcome to the top module, and the top module decides which of the one or more block modules should be executed next based on the control flow outcome.

8. The method according to claim 1, wherein the step (4) comprises the steps of:
  at the starting point, executing the software code part in the main core;
  if execution of the HDL code is needed during the execution of the software code part, transferring an enable signal to enable the dedicated hardware and parameters from the main core to the dedicated hardware;
  by the dedicated hardware enabled by the enable signal, recording a result of the execution of the HDL code, updating data, and transferring an interrupt signal to the main core; and
  by the main core, continuing to execute the software code part with the updated data.

9. A system for translating a high level language code into a HDL code, comprising:
  a C-to-C source translator which reads API, such as a pragma, from a translation-targeted high level language code marked with the API, separates the translation-targeted high level language code into a hardware code part and a software code part, and stores the hardware code part and the software code part in separate files;
  a main compiler which compiles the stored software code part;
  a translator which translates the stored hardware code part into a HDL code including one or more block modules and one top module;
  a main core which executes the compiled software code part; and
  a dedicated hardware which executes the HDL code in cooperation with the main core,
  wherein the translator is attached to a backend of the main compiler and includes a machine description file whose syntax is equal to a HDL syntax, and a HDL control generator.

10. The system according to claim 9, wherein the hardware code part has a subroutine form of the translation-targeted high level language code, and the software code part contains the remaining parts of the translation-targeted high level language code, and a function call to the hardware code part.

11. The system according to claim 9, wherein the main compiler translates the hardware code part into a low level IR code, the machine description file generates the one or more block modules having body codes generated directly from the low level IR code, and the HDL control generator generates the one top module based on information of basic blocks of the low level IR code.

12. The system according to claim 9, wherein the one or more block modules and the top module are generated in the form of a Finite State Machine, the one or more block modules correspond to a sequence of consecutive low level IR instructions separated based on delay estimation and data dependency of the low level IR instructions and perform the same task as the basic blocks of the low level IR code, and the top module enables/disables the one or more block modules, schedules execution of the one or more block modules and creates instances of the one or more block modules.

13. The system according to claim 9, wherein the dedicated hardware assigns inputs to one or more of the block modules and operates the one or more block modules so that execution of the HDL code causes the top module to operate the one or more block modules at once, and waits for completion of the operation of the operated one or more block modules, the operated one or more block modules execute their own codes with the assigned inputs, buffer outputs in their own register sets or register sets shared with another of the block modules, and return the output buffered in the register sets as well as control flow outcome to the top module, and the top module decides which of the one or more block modules should be executed next based on the control flow outcome.

14. A system for translating a high level language code into a HDL code using a compiler backend, the compiler backend comprising:
  a main compiler;
  a machine description file whose syntax is equal to a HDL syntax attached to a backend of the main compiler; and
  a HDL control generator which is attached to the backend of the main compiler immediately before a stage that includes generation of a target assembly code,
  wherein the HDL code includes one or more block modules which perform the same task as basic blocks of a level IR code that is translated from the high level language code, and one top module which enables/disables the one or more block modules, schedules execution of the one or more block modules and creates instances of the one or more block modules.

15. The system according to claim 14, wherein the one or more block modules and the top module are generated in the form of a Finite State Machine, and the one or more block modules correspond to a sequence of consecutive low level IR code instructions of the low level IR code that are separated based on delay estimation and data dependency of the low level IR code instructions.

16. A method of translating a low level IR code of a compiler into a HDL code using a compiler backend, comprising the steps of:
  translating a high level language code into a low level IR code by means of a front end and a middle end of a main compiler; and
  translating the low level IR code into a HDL code immediately before generation of a target assembly code of the main compiler by means of a translator attached to a backend of the main compiler immediately before the stage of generation of the target assembly code,
  wherein the HDL code includes one or more block modules which perform the same task as basic blocks of the low level IR code, and one top module which enables/ disables the one or more block modules, schedules execution of the one or more block modules and creates instances of the one or more block modules.

17. The method according to claim 16, wherein the one or more block modules and the top module are generated in the form of a Finite State Machine, and the one or more block modules correspond to a sequence of consecutive low level IR instructions of the low level IR code that are separated based on delay estimation and data dependency of the low level IR instructions.

* * * * *